US012715229B2

(12) United States Patent
Aono

(10) Patent No.: US 12,715,229 B2
(45) Date of Patent: Aug. 25, 2026

(54) SHEET FEEDING APPARATUS TO BE CONNECTED TO IMAGE FORMING APPARATUS

(71) Applicant: CANON KABUSHIKI KAISHA, Tokyo (JP)

(72) Inventor: Kazuhiko Aono, Shizuoka (JP)

(73) Assignee: CANON KABUSHIKI KAISHA, Tokyo (JP)

(*) Notice: Subject to any disclaimer, the term of this patent is extended or adjusted under 35 U.S.C. 154(b) by 232 days.

(21) Appl. No.: 18/781,687

(22) Filed: Jul. 23, 2024

(65) Prior Publication Data

US 2025/0033384 A1 Jan. 30, 2025

(30) Foreign Application Priority Data

Jul. 26, 2023 (JP) ................................ 2023-121556

(51) Int. Cl.

| | |
|---|---|
| ***B41J 13/10*** | (2006.01) |
| ***B41J 13/03*** | (2006.01) |
| *B41J 3/60* | (2006.01) |

(52) U.S. Cl.

CPC ............. *B41J 13/03* (2013.01); *B41J 13/103* (2013.01); *B41J 3/60* (2013.01)

(58) Field of Classification Search

None

See application file for complete search history.

(56) References Cited

U.S. PATENT DOCUMENTS

| | | | | |
|---|---|---|---|---|
| 4,127,334 A * | 11/1978 | Watanabe | B41J 25/006 400/323 |
| 2005/0123318 A1* | 6/2005 | Nishitani | G03G 15/00 399/107 |
| 2016/0231703 A1* | 8/2016 | Sato | G03G 21/1853 |
| 2020/0192267 A1* | 6/2020 | Saito | B65H 1/04 |

FOREIGN PATENT DOCUMENTS

| | | |
|---|---|---|
| JP | H0710366 A | 1/1995 |
| JP | 2001192125 A | 7/2001 |
| JP | 2021050070 A | 4/2021 |
| JP | 2021066555 A | 4/2021 |

* cited by examiner

*Primary Examiner* — Scott A Richmond

(74) *Attorney, Agent, or Firm* — Canon U.S.A., Inc. IP Division

(57) ABSTRACT

A sheet feeding apparatus is configured to feed a recording medium to an image forming apparatus. The sheet feeding apparatus includes a housing part that includes a first frame, a second frame, a feed unit, a first member, a weight unit fixed to the first member, and a supporting member that is configured to support the recording medium and is movable in a first direction from a first position at which the feed unit is able to feed the recording medium to a second position at which the recording medium is able to be stacked in the supporting member. The housing part is a part of the sheet feeding apparatus excluding the supporting member. The first member and the weight unit are positioned upstream in the first direction from a center of gravity of the housing part. The weight unit is heavier than the first member.

25 Claims, 15 Drawing Sheets

SHEET FEEDING APPARATUS TO BE CONNECTED TO IMAGE FORMING APPARATUS

BACKGROUND

Field

The present disclosure relates to a sheet feeding apparatus to be connected to the image forming apparatus.

Description of the Related Art

Japanese Patent Laid-Open No. 7-10366 describes a sheet feeding apparatus equipped with multiple sheet trays and connected to an image forming apparatus. In order to prevent an image forming apparatus from toppling over when the sheet trays are drawn, the image forming apparatus poses limits on the number and types of sheet trays that can be drawn simultaneously.

SUMMARY

The present disclosure provides a sheet feeding apparatus with improved stability, thereby improving the stability of an image forming apparatus to which the sheet feeding apparatus is connected.

According to some embodiments, a sheet feeding apparatus may be configured to be connected to an image forming apparatus and to feed a recording medium to the image forming apparatus.

The sheet feeding apparatus includes a housing part that includes a first frame, a second frame, a feed unit that is positioned between the first frame and the second frame in a rotational axis direction of the feed unit and is configured to feed the recording medium, a first member fixed to the first frame and to the second frame, and a weight unit fixed to the first member. The sheet feeding apparatus also includes a supporting member that is configured to support the recording medium and is movable in a first direction from a first position to a second position, the first position being a position at which the feed unit is able to feed the recording medium, the second position being a position at which the recording medium is able to be stacked in the supporting member.

The housing part is a part of the sheet feeding apparatus excluding the supporting member. The first member and the weight unit are positioned upstream in the first direction from a center of gravity of the housing part, and the weight unit is heavier than the first member.

Further features of the present disclosure will become apparent from the following description of exemplary embodiments with reference to the attached drawings.

DESCRIPTION OF THE EMBODIMENTS

Figure 1:
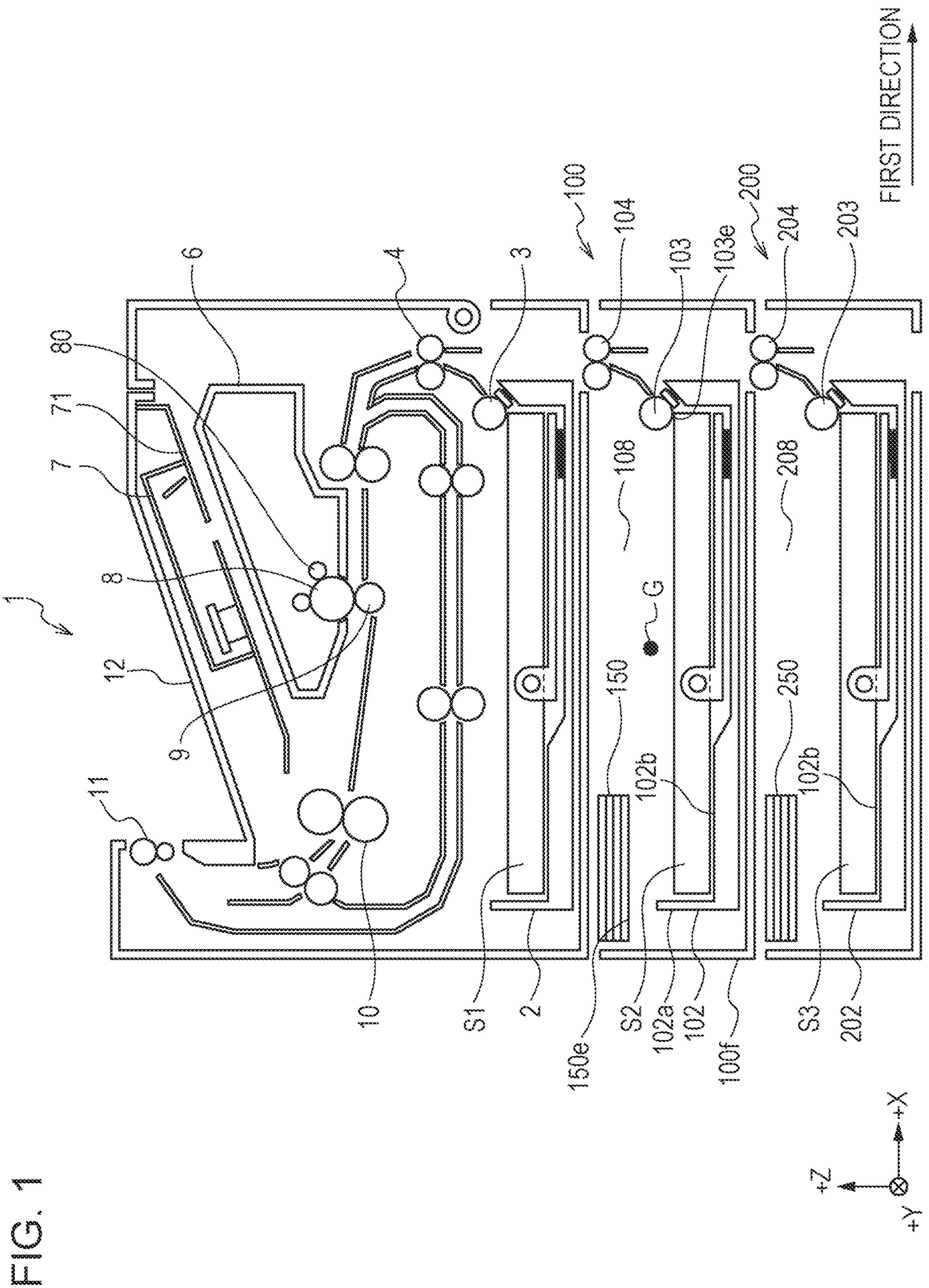
FIG. 1 is a schematic view illustrating an image forming apparatus and sheet feeding apparatuses according to Example 1.

Various exemplary embodiments, features, and aspects of the present disclosure will be described in detail with reference to the attached drawings.

Example 1

An image forming apparatus 1 according to Example 1 will be described with reference to FIGS. 1 to 7. In the following description and in the drawings, the Z direction is defined as the vertical direction when the image forming apparatus 1 is placed on a horizontal plane. The Y direction is defined as the extending direction of the rotational axis of a pickup roller 103 (to be described later), the extending direction intersecting the Z direction. The X direction is defined as a movement direction of a cassette 102 (to be described later), the movement direction intersecting both the Z direction and the Y direction. The X direction and the Y direction can extend horizontally. The X direction, the Y direction, and the Z direction can orthogonally intersect each other. As indicated by arrows in the drawings, the +X direction is directed toward the +X side, and the −X direction is directed oppositely, in other words, directed toward the −X side. The +Y direction is directed toward the +Y side, and the −Y direction is directed oppositely, in other words, directed toward the −Y side. The +Z direction is directed toward the +Z side, and the −Z direction is directed oppositely, in other words, directed toward the −Z side.

Overall Structure of Image Forming Apparatus and of Sheet Feeding Apparatus

Figure 2:
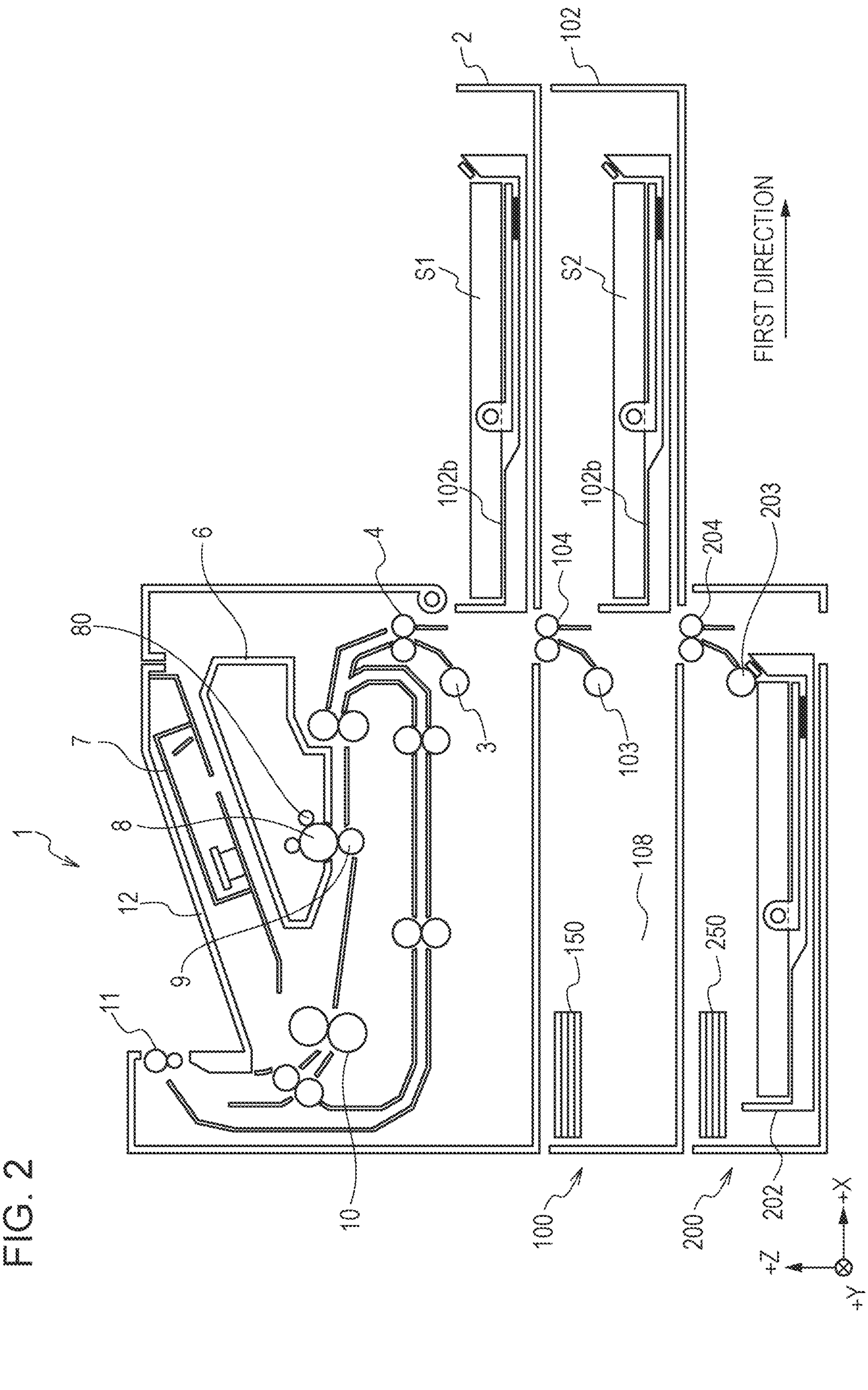
FIG. 2 is another schematic view illustrating the image forming apparatus and the sheet feeding apparatuses according to Example 1.

Overall structures of the image forming apparatus 1, a sheet feeding apparatus 100, and a sheet feeding apparatus 200 will be described with reference to FIGS. 1 and 2. FIG. 1 schematically illustrates the image forming apparatus 1, the sheet feeding apparatus 100, and the sheet feeding apparatus 200.

A structure of the image forming apparatus 1 will be described first. FIG. 1 illustrates a laser beam printer as an example of the image forming apparatus 1 of the present example. Types of recording media to be used for the image forming apparatus 1 may include a sheet of paper, such as plain paper and thick paper, a plastic film, a piece of cloth, a surface treated paper material, such as a coated paper, or a specially shaped paper material, such as an envelope or an indexed sheet. In other words, various types of sheets of different sizes and materials can be used as the recording medium.

The image forming apparatus 1 includes a scanner unit 7, a scanner stay 71, a photosensitive drum 8, a cassette 2, a pickup roller 3 (or a feed unit), a conveyance roller pair 4, a processing cartridge 6, a transfer roller 9, a fixing unit 10, a discharge roller pair 11, and a discharge tray 12. The processing cartridge 6 includes a developing member 80. The processing cartridge 6 is detachably attached to the image forming apparatus 1.

The scanner unit 7 is used to form an electrostatic latent image on the photosensitive drum 8 in accordance with image data. The scanner stay 71 supports the scanner unit 7. The photosensitive drum 8 is an image carrying member that carries the electrostatic latent image. The developing member 80 develops the electrostatic latent image on the photosensitive drum 8 using toner. The cassette 2 is a supporting member that can support sheets S1. The pickup roller 3 is a roller that comes into contact with a sheet S1 supported by the cassette 2 and picks up and sends the sheet S1 to the conveyance roller pair 4. The conveyance roller pair 4 conveys the sheet S1 coming from the pickup roller 3 to the transfer roller 9. The transfer roller 9 transfers the image to the sheet S1. The fixing unit 10 fixes the image transferred on the sheet S1 by heating and pressing the sheet S1. After passing through the fixing unit 10, the sheet S1 is sent to the discharge roller pair 11, and the discharge roller pair 11 discharges the sheet S1 onto the discharge tray 12.

Next, a structure of the sheet feeding apparatus 100 will be described with reference to FIG. 1. Note that the structure of the sheet feeding apparatus 200 is the same as that of the sheet feeding apparatus 100 and a detailed description of the sheet feeding apparatus 200 may be omitted. As illustrated in FIG. 1, the sheet feeding apparatus 100 is configured to be connected to the image forming apparatus 1 and configured to supply sheets thereto. In the present example, the sheet feeding apparatus 100 is detachably connected to the image forming apparatus 1. The sheet feeding apparatus 200 is configured to be connected to the sheet feeding apparatus 100 and configured to send sheets thereto. In the present example, the sheet feeding apparatus 200 is detachably connected to the sheet feeding apparatus 100. Accordingly, multiple sheet feeding apparatuses can be connected to the image forming apparatus 1 to increase the number of sheets and sheet types to be stored. Although two sheet feeding apparatuses are connected to the image forming apparatus 1 in the present example, the number of sheet feeding apparatuses to be connected is not limited to this example.

The sheet feeding apparatus 100 includes a cassette 102, a pickup roller 103 (or the feed unit), a conveyance roller pair 104, and a weight unit 150. Similarly, the sheet feeding apparatus 200 includes a cassette 202, a pickup roller 203 (or a feed unit), a conveyance roller pair 204, and a weight unit 250. The cassette 102 is a supporting member with a supporting surface 102*b* on which sheets S2 are supported. Here, a housing part 108 is defined as a part of the sheet feeding apparatus 100 that excludes the cassette 102. The housing part 108 includes the pickup roller 103 (or the feed unit), the conveyance roller pair 104, and the weight unit 150. The housing part 108 also includes a left plate 131, a right plate 132, a rear top plate 133, and a front top plate 135, which will be described later. The pickup roller 103 is a roller that comes into contact with a sheet S2 supported by the cassette 102 and picks up and sends the sheet S2 to the conveyance roller pair 104. The conveyance roller pair 104 conveys the sheet S2 coming from the pickup roller 103 to the conveyance roller pair 4. The conveyance roller pair 104 also sends a sheet S3 coming from the conveyance roller pair 204 of the sheet feeding apparatus 200 to the conveyance roller pair 4. A weight unit 150 and a weight unit 250 are members for improving the stability of respective sheet feeding apparatuses. These weight units will be described in detail later.

Next, the movement of the cassette 102 is described with reference to FIGS. 1 and 2. FIG. 2 is a schematic view illustrating a state of the cassette 102 that is pull out in the +X direction (or in the first direction). The cassette 102 is movable relative to the housing part 108 between the position illustrated in FIG. 1 (i.e., a first position) and the position illustrated in FIG. 2 (i.e., a second position). When the cassette 102 is at the first position, the supporting surface 102*b* of the cassette 102 is positioned inside the housing part 108. When the cassette 102 is at the second position, the supporting surface 102*b* of the cassette 102 is positioned outside the housing part 108. When the cassette 102 is positioned as illustrated in FIG. 2, a user can set sheets in the cassette 102. When the cassette 102 is at the first position, the pickup roller 103 can pick up and feed sheets S2. The cassette 102 is structured so as to be able to move in the first direction (i.e., in the +X direction) from the first position to the second position.

The movement of the cassette 2 and the movement of the cassette 202 are the same as the above-described movement of the cassette 102, and the description of these movements will be omitted. In the present example, the sheet feeding apparatus 200 is the same in shape as the sheet feeding apparatus 100.

Connection Between Image Forming Apparatus and Sheet Feeding Apparatus

Figure 3:
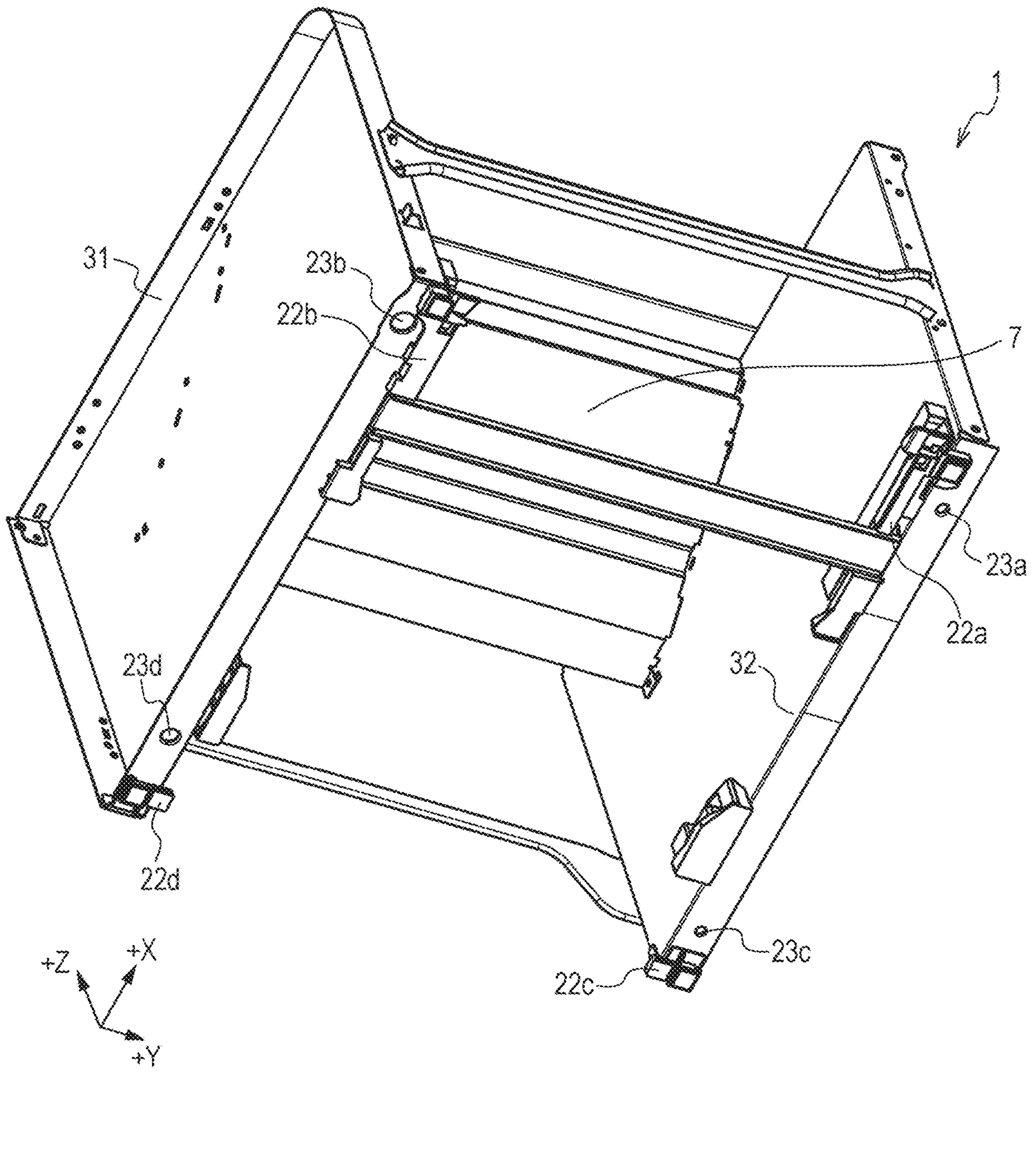
FIG. 3 is a schematic view illustrating the image forming apparatus of Example 1.

Next, a structure for the connection between the image forming apparatus 1 and the sheet feeding apparatus 100 will be described with reference to FIGS. 3 to 5. The connection structure for the image forming apparatus 1 is described first. FIG. 3 is a schematic view of the image forming apparatus 1. As illustrated in FIG. 3, the image forming apparatus 1 includes a left plate 31 and a right plate 32. The left plate 31 has abutment portions 22*b* and 22*d* and first positioning holes 23*b* and 23*d*, which are formed at the end of the left plate 31, the end facing in the −Z direction. Similarly, the left plate 32 has abutment portions 22*a* and 22*c* and first positioning holes 23*a* and 23*c*, which are formed at the end of the right plate 32, the end facing in the −Z direction.

The left plate 31 and the right plate 32 are metal plates that stretch in the X direction and in the Z direction. As illustrated in FIG. 3, the end of the scanner stay 71 facing in the −Y direction is connected to the left plate 31, and the end of the scanner stay 71 facing in the +Y direction is connected to the right plate 32. In addition, the end of the processing cartridge 6 facing in the −Y direction is supported by the left plate 31, and the end of the processing cartridge 6 facing in the +Y direction is supported by the right plate 32. In other words, the scanner stay 71, the scanner unit 7, and the processing cartridge 6 are disposed, in the Y direction, between the left plate 31 and the right plate 32. The scanner unit 7 is fixed to the left plate 31 and the right plate 32, and the processing cartridge 6 is supported by the left plate 31 and the right plate 32 so as to be movable relative to the left plate 31 and the right plate 32.

The abutment portions 22*a* to 22*d* in FIG. 3 are configured to come into contact with the sheet feeding apparatus 100 when the image forming apparatus 1 is placed vertically on the sheet feeding apparatus 100. The first positioning holes

23*a* to 23*d* are holes for receiving respective positioning pins 140 to 143 of the sheet feeding apparatus 100, which will be described later.

Next, a connection structure for the sheet feeding apparatus 100 will be described with reference to FIGS. 4 and 5 that are perspective views illustrating the sheet feeding apparatus 100.

Figure 4:
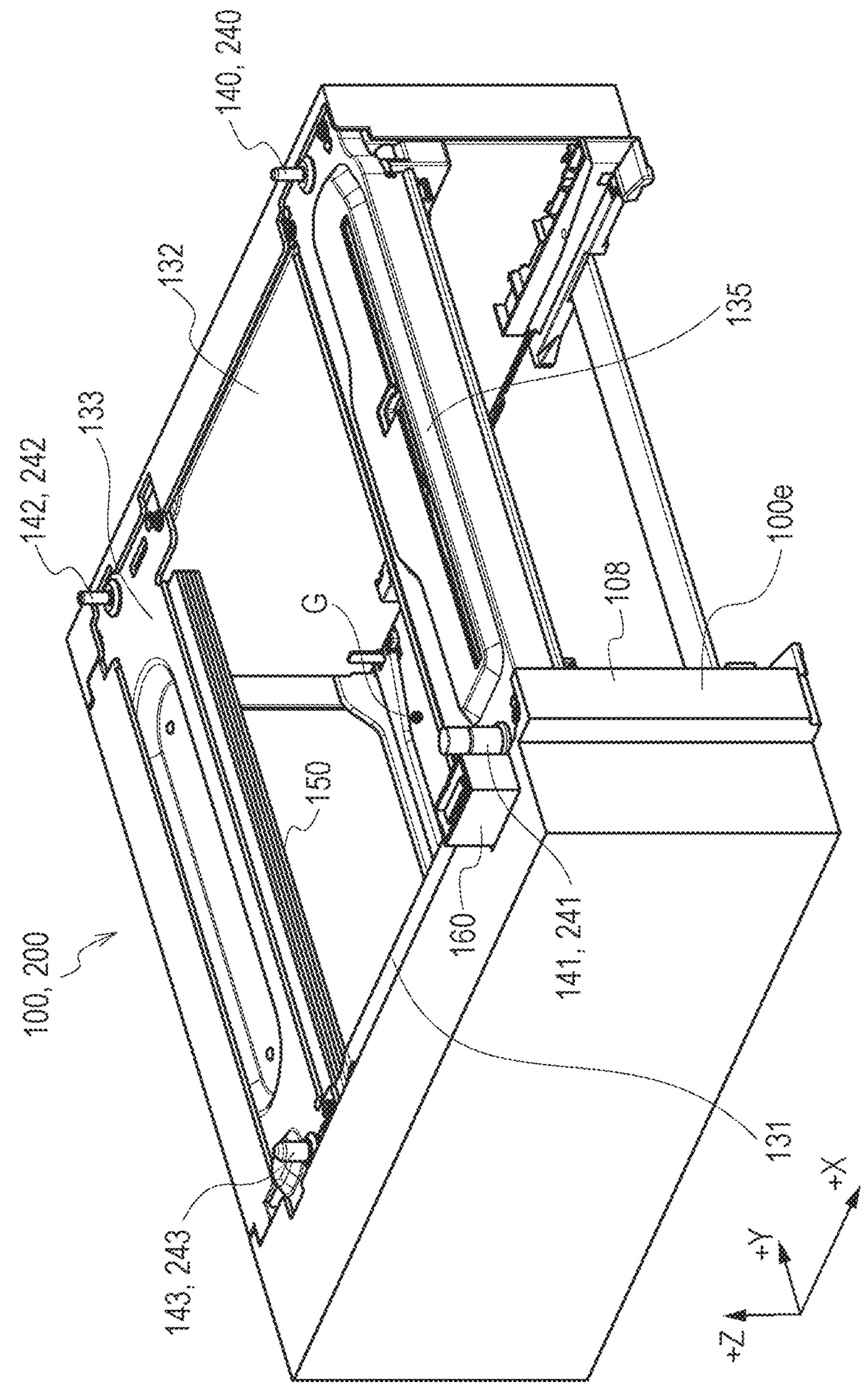
FIG. 4 is a perspective view illustrating the sheet feeding apparatus of Example 1.
Figure 5:
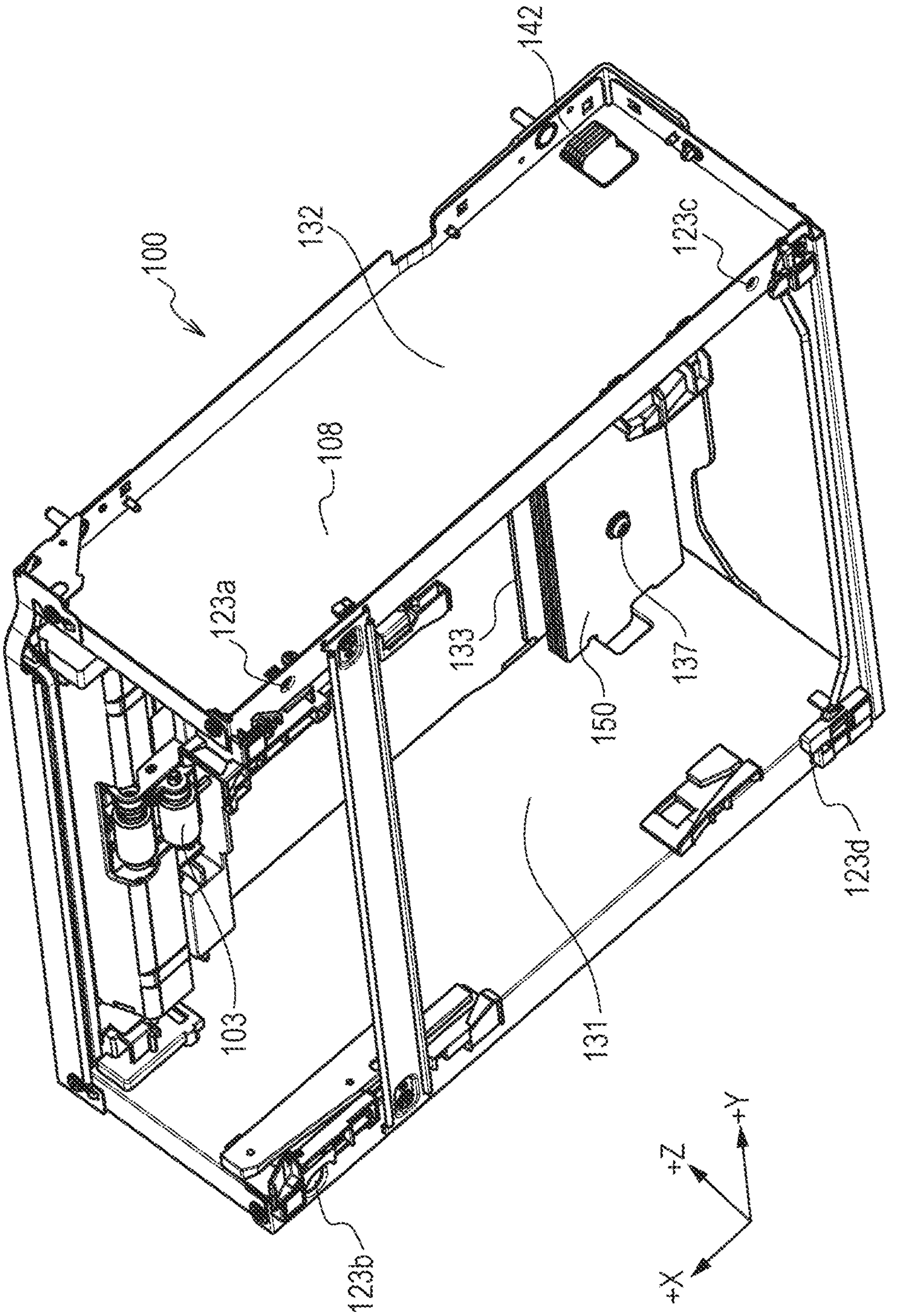
FIG. 5 is another perspective view illustrating the sheet feeding apparatus of Example 1.

As illustrated in FIG. 4, the sheet feeding apparatus 100 includes positioning pins 140 to 143, a drawer connector 160, a left plate 131 (or a first frame), a right plate 132 (or a second frame), a front top plate 135, and a rear top plate 133 (or a first member). The left plate 131 and the right plate 132 are metal plates that stretch in the X direction and in the Z direction. As illustrated in FIG. 5, the pickup roller 103 is disposed, in the Y direction, between the left plate 131 and the right plate 132.

The front top plate 135 and the rear top plate 133 are metal plates that constitute an end portion of the sheet feeding apparatus 100, the end portion facing in the +Z direction. The front top plate 135 is closer to the end of the sheet feeding apparatus 100 facing in the +X direction than to the end of the sheet feeding apparatus 100 facing in the −X direction. The rear top plate 133 is closer to the end of the sheet feeding apparatus 100 facing in the −X direction than to the end of the sheet feeding apparatus 100 facing in the +X direction. The end portions of the front top plate 135 and the rear top plate 133 facing in the −Y direction are fixed to the left plate 131, and the end portions of the front top plate 135 and the rear top plate 133 facing in the +Y direction are fixed to the right plate 132. In other words, both of the front top plate 135 and the rear top plate 133 are fixed to the left plate 131 and the right plate 132. The weight unit 150, which will be described further later, is fixed to the rear top plate 133. Accordingly, the weight unit 150 applies a force in the −Z direction to the rear top plate 133. In the present example, the rear top plate 133 is fixed to both the left plate 131 and the right plate 132, which enables the rear top plate 133, the left plate 131, and the right plate 132 to combinedly take the force from the weight unit 150.

The positioning pins 140 to 143 are disposed at the end portions of the front top plate 135 and the rear top plate 133, the end portions (i.e., the surfaces) facing in the +Z direction. The positioning pin 140 is configured to enter the first positioning hole 23*a*. The positioning pin 141 is configured to enter the first positioning hole 23*b*. The positioning pin 142 is configured to enter the first positioning hole 23*c*. The positioning pin 143 is configured to enter the first positioning hole 23*d*. These pins and holes enable the sheet feeding apparatus 100 to be positioned appropriately relative to the image forming apparatus 1. The positioning pins 140 to 143 constitute a connection portion for connecting the sheet feeding apparatus 100 to the image forming apparatus 1. The positioning pin 140 is positioned closer to the end of the front top plate 135 facing in the +Y direction than to the end of the front top plate 135 facing in the −Y direction. The positioning pin 141 is positioned closer to the end of the front top plate 135 facing in the −Y direction than to the end of the front top plate 135 facing in the +Y direction. The positioning pin 142 is positioned closer to the end of the rear top plate 133 facing in the +Y direction than to the end of the rear top plate 133 facing in the −Y direction. The positioning pin 143 is positioned closer to the end of the rear top plate 133 facing in the −Y direction than to the end of the rear top plate 133 facing in the +Y direction. The drawer connector 160 is configured to be connected to the drawer connector of the image forming apparatus 1 to supply electric power to the sheet feeding apparatus 100.

Connection Between Sheet Feeding Apparatus 100 and Sheet Feeding Apparatus 200

Next, a structure for the connection between the sheet feeding apparatus 100 and the sheet feeding apparatus 200 is described. As illustrated in FIG. 4, the sheet feeding apparatus 200 has positioning pins 240 to 243. As illustrated in FIG. 5, the sheet feeding apparatus 100 has second positioning holes 123*a* to 123*d*. The positioning pin 240 is configured to enter the second positioning hole 123*a*. The positioning pin 241 is configured to enter the second positioning hole 123*b*. The positioning pin 242 is configured to enter the second positioning hole 123*c*. The positioning pin 243 is configured to enter the second positioning hole 123*d*. These pins and holes enable the sheet feeding apparatus 200 to be positioned appropriately relative to the sheet feeding apparatus 100. The positioning pins 240 to 243 constitute a connection portion for connecting the sheet feeding apparatus 200 to the sheet feeding apparatus 100. Note that in the present example, the structure for positioning the sheet feeding apparatus 100 relative to the image forming apparatus 1 is the same as the structure for positioning the sheet feeding apparatus 200 relative to the sheet feeding apparatus 100.

Structure of Weight Unit

Next, a structure of the weight unit 150 is described with reference to FIGS. 4 and 5. The weight unit 150 is a member for improving the stability of the sheet feeding apparatus 100. The weight unit 150 includes five weight members. Since the weight unit 150 is formed of multiple weight members, it is easy to adjust the weight of the weight unit 150. The weight unit 150 may include at least one weight member. Each weight member is a metal plate that is shaped like a cuboid and stretches in the X direction and in the Y direction.

In the Z direction, the thickness of the weight member is smaller than the thickness of the rear top plate. The weight member has a hole. As illustrated in FIG. 5, a fixation member 137 is disposed through the holes of the weight members and fixed to the end of the rear top plate 133 facing in the −Z direction (i.e., the lower surface of the rear top plate 133 in the vertical direction). In the present example, the fixation member 137 is a screw fastened to the rear top plate 133. The fixation member 137 may be any member that can pass through the holes of the weight members and can fix the weight members to the end of the rear top plate 133 in the −Z direction (i.e., lower surface of the rear top plate 133 in the vertical direction). For example, the fixation member 137 may be a rivet.

In the Y direction, one end of each weight member (i.e., the end facing +Y direction) is closer to the right plate 132 than to the left plate 131. In the Y direction, the other end of each weight member (i.e., the end facing −Y direction) is closer to the left plate 131 than to the right plate 132. Moreover, in the Y direction, the length of the weight member is greater than the distance between the right plate 132 and the left plate 131. As illustrated in FIG. 5, the weight member passes through a hole formed in the right plate 132 and also through a hole formed in the left plate 131.

Although the weight unit 150 is directly fixed to the rear top plate 133 in Example 1, a different member may be interposed between the weight unit 150 and the rear top plate 133. The weight member does not need to be a metal plate.

Stability of Sheet Feeding Apparatus

Next, a structure related to the stability of the sheet feeding apparatus 100 is described with reference to FIGS. 1 and 4 that illustrates the center of gravity G of the housing part 108. As illustrated in FIGS. 1 and 4, the weight unit 150 is positioned upstream in the +X direction (i.e., in the first direction) from the center of gravity G. Disposing the weight unit 150 at a position upstream of the center of gravity G can shift the center of gravity of the sheet feeding apparatus 100 further in the −X direction compared with a case in which the weight members are not disposed. This can improve the stability of the sheet feeding apparatus 100 when the cassette 102 is pulled out in the first direction and thereby improve the stability of the image forming apparatus 1 to which the sheet feeding apparatus 100 is connected. Similarly, the rear top plate 133 is also disposed at a position upstream in the +X direction (i.e., in the first direction) from the center of gravity G, which further improves the stability of the sheet feeding apparatus 100. The weight unit 150 is heavier than the rear top plate 133.

The weight unit 150 and the rear top plate 133 are positioned closer to the end of the housing part 108 facing in the −X direction than to the end of the housing part 108 facing in the +X direction. In addition, the weight unit 150 and the rear top plate 133 are positioned above the level of the cassette 102 in the Z direction. An enough space for accommodating components is available inside the sheet feeding apparatus 100 in the region that is closer to the end of the housing part 108 facing in the −X direction than to the end of the housing part 108 facing in the +X direction and that is positioned above the level of the cassette 102 in the Z direction. Accordingly, the weight unit 150 can be disposed inside the sheet feeding apparatus 100 without increasing the product size of the sheet feeding apparatus 100.

In addition, as illustrated in FIG. 1, the end 150*e* of the weight unit 150 facing downward in the vertical direction is positioned above the level of the end 103*e* of the pickup roller 103 facing downward in the vertical direction. In addition, as illustrated in FIG. 1, the weight unit 150 is closer to an upstream end 100*f* of the housing part 108 (i.e., housing upstream end 100*f*) in the first direction than the cassette 102 is to the housing upstream end 100*f*. When the cassette 102 is at the first position, the weight unit 150 is positioned directly above the supporting surface 102*b* of the cassette 102. In other words, the position of the weight unit 150 is lapped over the position of the supporting surface 102*b* in the X direction. Disposing the weight unit 150 in this manner can reduce an increase in the size of the sheet feeding apparatus 100.

A large number of sheets may be set in the cassette 102 depending on user's needs. In such a case, when the cassette 102 is moved in the first direction, the center of gravity of the sheet feeding apparatus 100 is shifted further in the first direction compared with a case in which a large number of sheets are not set in the cassette 102. This decreases the stability of the sheet feeding apparatus 100. In the present example, the sheet feeding apparatus 100 is formed so as to satisfy the following relations in order to improve the stability of the sheet feeding apparatus 100.

$$Mr>Mp$$

$$Mp=S\times N\times m$$

where

Mr: weight of an upstream portion of the housing part 108;

Mp: weight of the maximum number of first standard-sized sheets to be stacked in the sheet feeding apparatus 100;

S: area ($m^2$) of each one of the first standard-sized sheets;

N: the maximum number of first standard-sized sheets to be stacked; and m: unit weight ($g/m^2$) of the first standard-sized sheet.

The following explanation is given to further describe the above relations. Mr above is the weight of an upstream portion of the housing part 108. The upstream portion is a portion of the housing part 108 positioned upstream of the center of gravity G in the first direction.

Figure 6A:
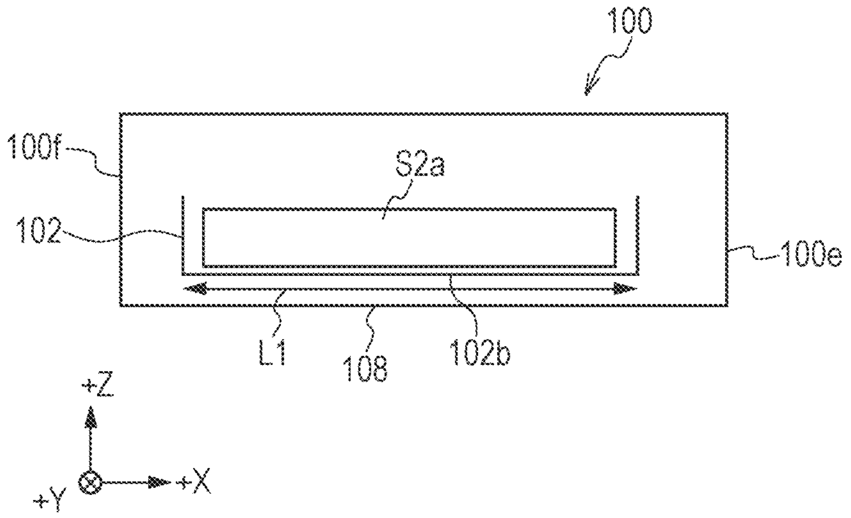
FIGS. 6A and 6B are schematic views illustrating the sheet feeding apparatus of Example 1.
Figure 6B:
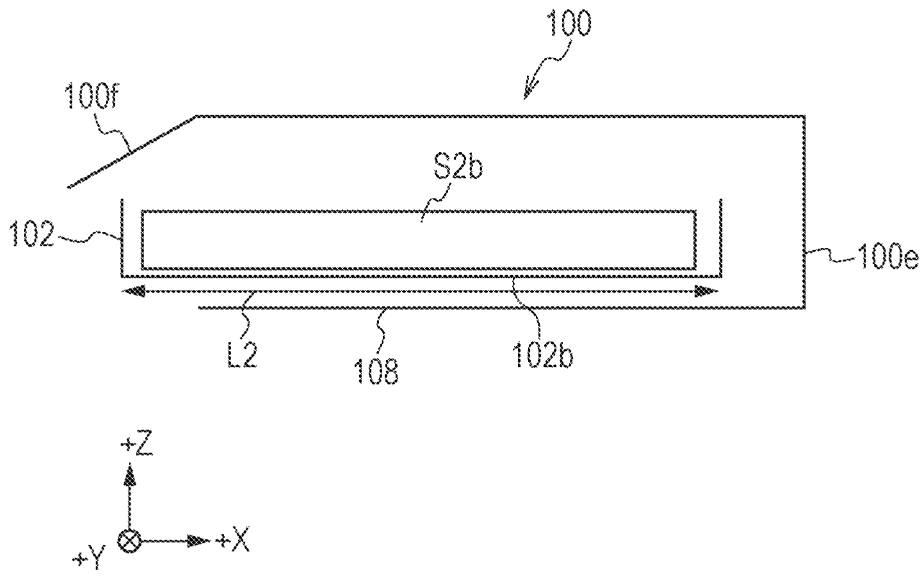

The standard-sized sheet corresponds to a sheet of which the size is defined, for example, in ISO 21. For example, the standard-sized sheet can be an A4-size or A3-size paper. The following describes the first standard-sized sheet with reference to FIGS. 6A and 6B. In FIG. 6A, L1 denotes the length of the cassette 102 in the first direction when the cassette 102 is in a first state. In this state, sheets S2*a* are set in the cassette 102. In FIG. 6B, L2 denotes the length of the cassette 102 in the first direction when the cassette 102 is in a second state, in other words, when the cassette 102 is stretched, from the first state, in the −X direction (in the direction opposite to the first direction). In the second state, standard-sized sheets S2*b*, which are longer than the sheets S2*a* in the first direction, can be set in the cassette 102. In the present example, the length of the cassette 102 in the first direction can be increased from the first state to the second state. An end 100*e* is a downstream end of the housing part 108 (i.e., a housing downstream end) in the first direction. An end 100*f* is an upstream end of the housing part 108 in the first direction.

In the present example, as illustrated in FIGS. 1 and 4, the pickup roller (feed unit) 103 is closer to the end 100*e* than the pickup roller (feed unit) 103 is to the end 100*f*. When the cassette 102 is in the first state, the supporting surface 102*b* is positioned between the end 100*e* (the housing downstream end) and the end 100*f* (the housing upstream end) in the first direction. In the present example, the end 100*f* is turnable clockwise as viewed in the +Y direction. The stretched cassette 102 does not hit the end 100*f* since the end 100*f* is turned from the position in the first state. In the second state, the end 100*f* overlaps the supporting surface 102*b* as viewed in the +Z direction. In the present example, the first standard-sized sheet is defined as the largest standard-sized sheet (S2*a*) that can be accommodated in the cassette 102 in the first state. Note that as different from the present example, the cassette 102 may be unstretchable. In this case, the first standard-sized sheet is the largest standard-sized sheet that can be accommodated in the cassette 102.

Figure 7A:
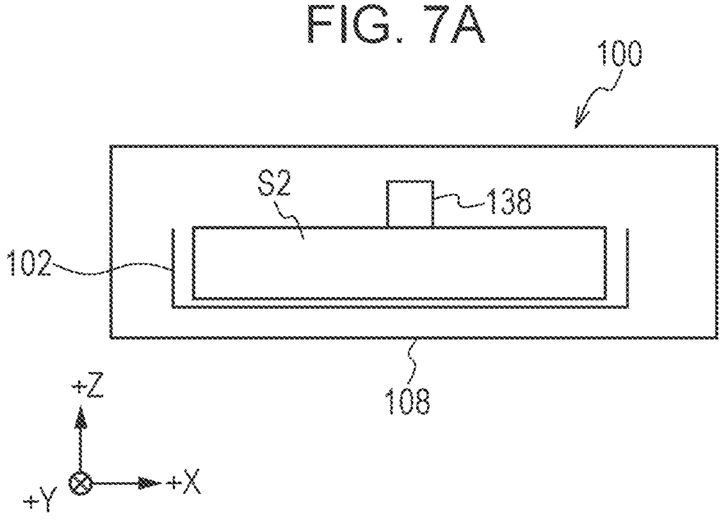
FIGS. 7A, 7B, and 7C are schematic views illustrating the sheet feeding apparatus of Example 1.

The following explanation relates to N above (i.e., the maximum number of first standard-sized sheets to be stacked). N above denotes the maximum number of first standard-sized sheets that can be stacked in the cassette 102. In the present example, the maximum number of sheets to be stacked is defined as the number of sheets when the first standard-sized sheets stacked on the supporting surface 102*b* reaches a predetermined height in the vertical direction (otherwise called the "height limit"). FIG. 7A illustrates a restriction member 138. The restriction member 138 is configured to come into contact with the stack of the first standard-sized sheets when the stack reaches the height limit, thereby preventing the first standard-sized sheets from being stacked more on the supporting surface 102*b*. The lower surface of the restriction member 138 is disposed at a position corresponding to the height limit (in other words, the height of the maximum number of recording media). The restriction member 138 prevents the first standard-sized sheets from being stacked on the supporting surface 102*b* above the level of the lower surface of the restriction member 138. In the example illustrated in FIG. 7A, the maximum number of sheets to be stacked is defined as the number of sheets when the first standard-sized sheets stacked on the supporting surface 102*b* touch the restriction member 138.

Figure 7B:
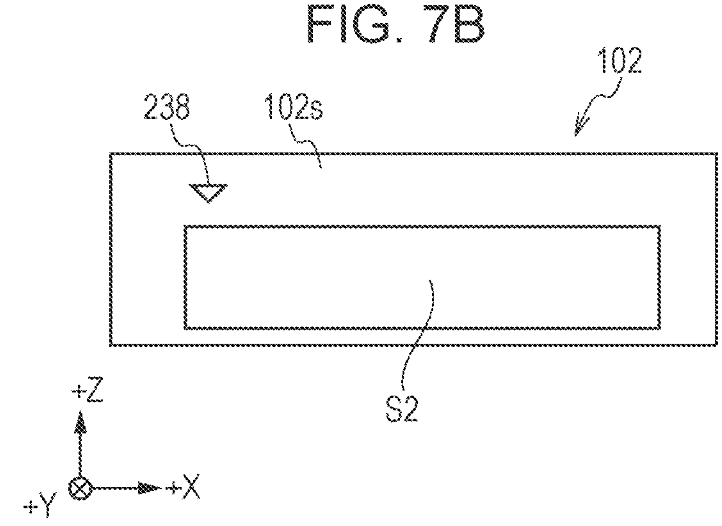

As different from the present example, a marking 238 may be provided on a side plate 102*s* of the cassette 102 as illustrated in FIG. 7B. The marking 238 can be used for a user to observe whether the first standard-sized sheets reach the height limit. When the first standard-sized sheets reaches the height limit, the first standard-sized sheets overlap the marking 238 as viewed in the +Y direction, which enables the user to recognize whether the first standard-sized sheets reach the height limit. In the example illustrated in FIG. 7B, the maximum number of sheets to be stacked is defined as the number of sheets when the first standard-sized sheets overlaps the marking 238 as viewed in the +Y direction.

Figure 7C:
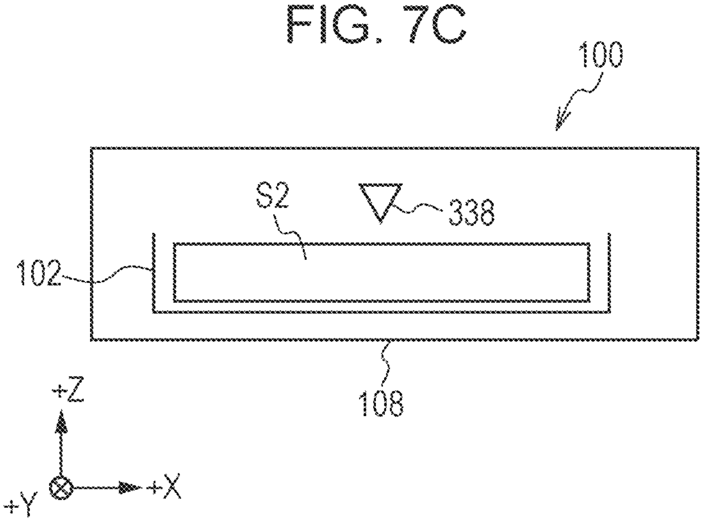

As different from the present example, a detector 338 configured to detect the height of the first standard-sized sheets stacked on the supporting surface 102*b* may be provided as illustrated in FIG. 7C. For example, the detector 338 may be a device that can optically detect the height limit of the first standard-sized sheets stacked on the supporting surface 102*b* or a device that can detect the contact between the restriction member 138 and the first standard-sized sheets. In the example illustrated in FIG. 7C, the maximum number of sheets to be stacked is defined as the number of sheets when the detector 338 detects the height limit of the first standard-sized sheets or detects the contact between the restriction member 138 and the first standard-sized sheets.

Alternatively, for example, the maximum number of sheets to be stacked may be the maximum number of sheets indicated in the product manual accompanying the image forming apparatus 1. Note that the sheet feeding apparatus 100 may have a display. When the height limit is detected in FIG. 7B, the detection results may be reported on the display.

In the present example, the unit weight of the standard-sized sheet is 80 $g/m^2$ (grams per meter squared), the area of an A4 sheet is 62,370 $mm^2$ (210 mm by 297 mm (millimeters)), and the area of an A3 sheet is 124,740 $mm^2$ (297 mm by 420 mm). In applying the above relations, however, the unit weight and the areas of the A4 sheet and A3 sheet do not need to take the above values.

The stability of the sheet feeding apparatus 100 can be improved by adjusting the weight balance of the sheet feeding apparatus 100 having the weight unit 150 so as to satisfy the above relations, thereby improving the stability of the image forming apparatus 1 to which the sheet feeding apparatus 100 is connected. Note that the sheet feeding apparatus 100 may be structured so as to satisfy the above relations without disposing the weight unit 150.

Example 2

Figure 8:
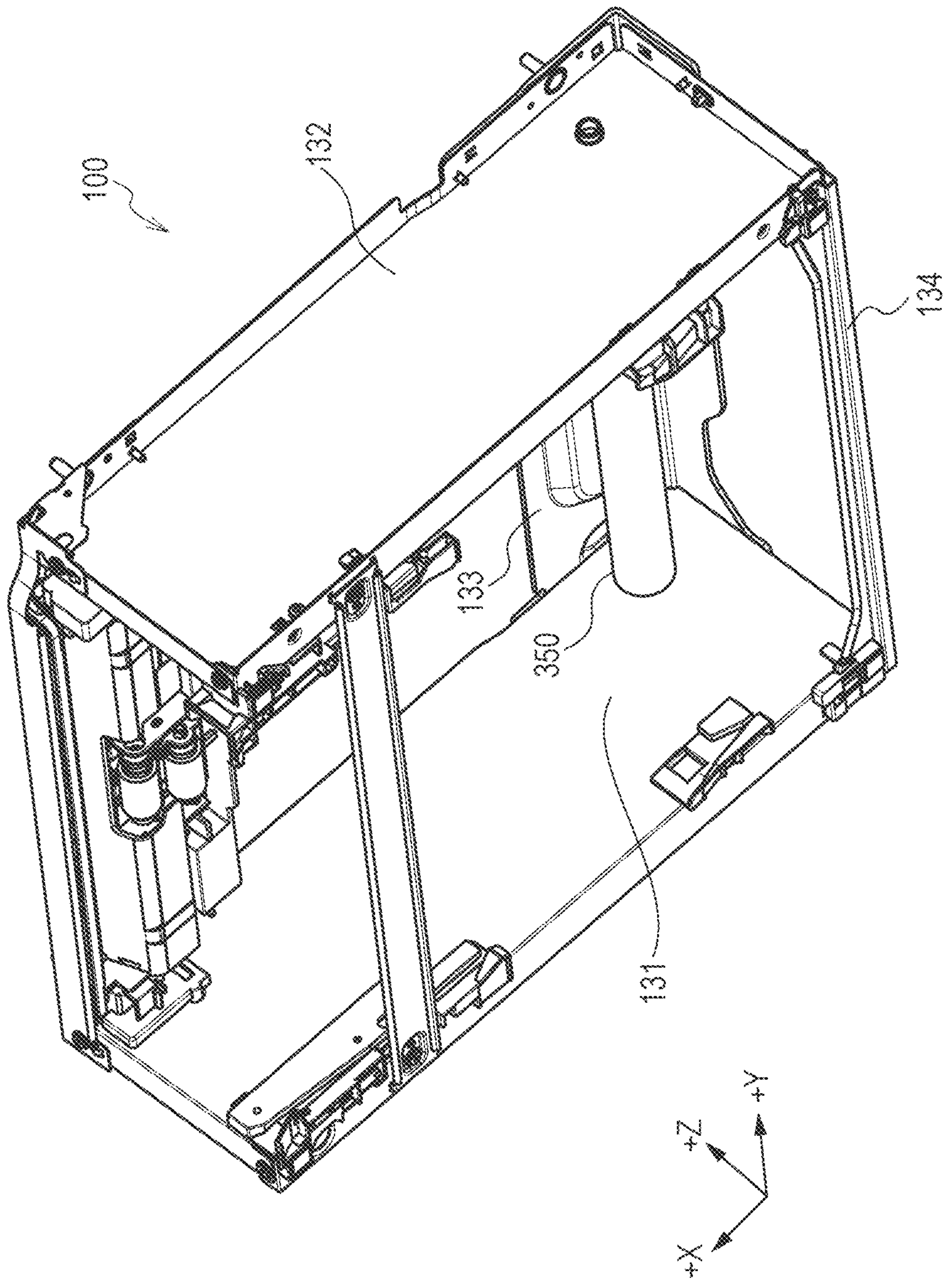
FIG. 8 is a perspective view illustrating a sheet feeding apparatus according to Example 2.
Figure 9:
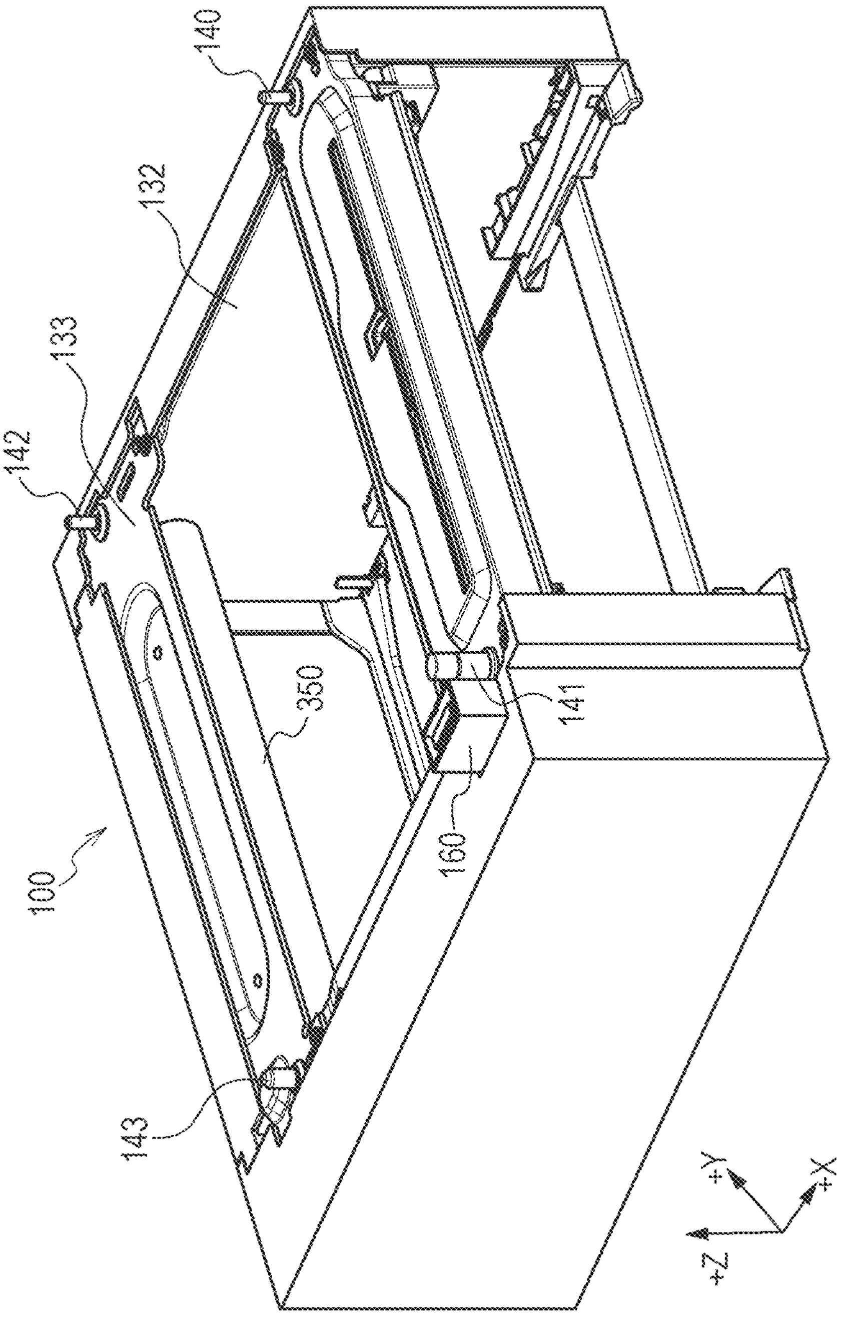
FIG. 9 is another perspective view illustrating the sheet feeding apparatus of Example 2.

Example 2 will be described with reference to FIGS. 8 and 9 that are perspective views illustrating the sheet feeding apparatus 100. Note that the elements denoted by the same reference signs as those of Example 1 have substantially the same structures and advantageous effects as those described in Example 1 and duplicated descriptions of these elements will be omitted. The same applies to subsequent Examples, and the descriptions of the elements having the same reference signs as those of Example 1 will be omitted.

In Example 1, the weight unit 150 has multiple weight members, and each weight member is shaped like a cuboid. In Example 2, however, a weight unit 350 has a single weight member that is shaped like a circular column. The weight unit 350 may be a hollow cylinder. For example, in the case of the weight unit 350 being a hollow cylinder, a liquid, such as water or grease, may be encapsulated therein in order to adjust the weight. In this case, a cap (not illustrated) is provided to seal the weight unit 350 that contains the liquid.

Example 3

Example 3 will be described with reference to FIG. 10 which is a perspective view illustrating the sheet feeding apparatus 100.

Figure 10:
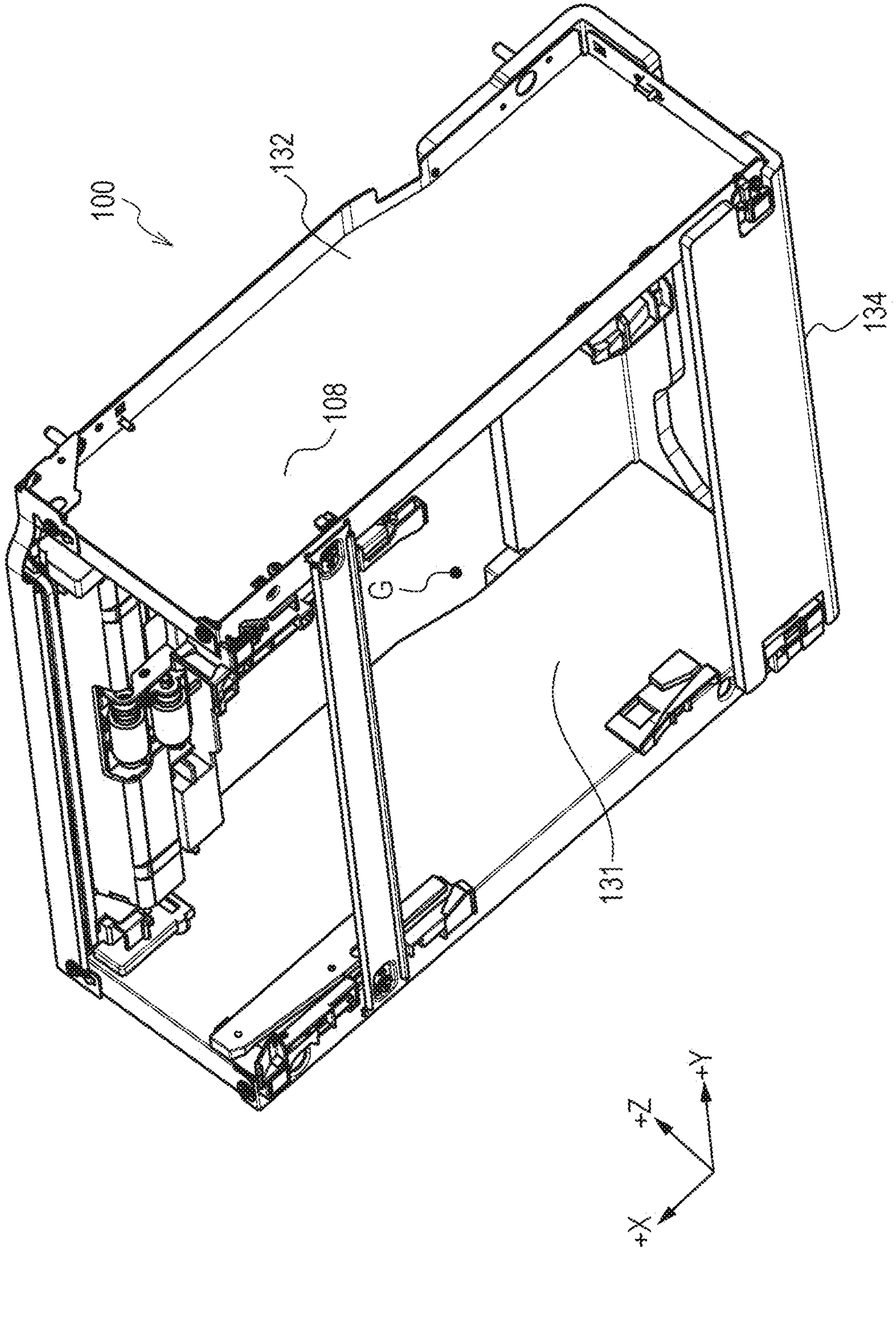
FIG. 10 is a perspective view illustrating a sheet feeding apparatus according to Example 3.

The sheet feeding apparatus 100 illustrated in FIG. 10 does not include the weight unit 150. In Example 3, a rear bottom plate 134 (a third frame) is disposed in the sheet feeding apparatus 100 configured as described in Example 1. The rear bottom plate 134 is a weight member that constitutes an end portion of the housing part 108 facing in the −Z direction. The rear bottom plate 134 is fixed to the left plate 131 and the right plate 132. In other words, the third frame is connected to the first frame and the second frame. This structure can increase the entire strength of the frame of the sheet feeding apparatus 100 having the left plate 131, the right plate 132, the rear top plate 133, the front top plate 135, etc. The rear bottom plate 134 is positioned upstream of the center of gravity G in the +X direction, and the center of gravity of the sheet feeding apparatus 100 is thereby shifted in the −X direction, compared with a case of not providing the rear bottom plate 134. Accordingly, the stability of the sheet feeding apparatus 100 is improved.

Example 4

Figure 11:
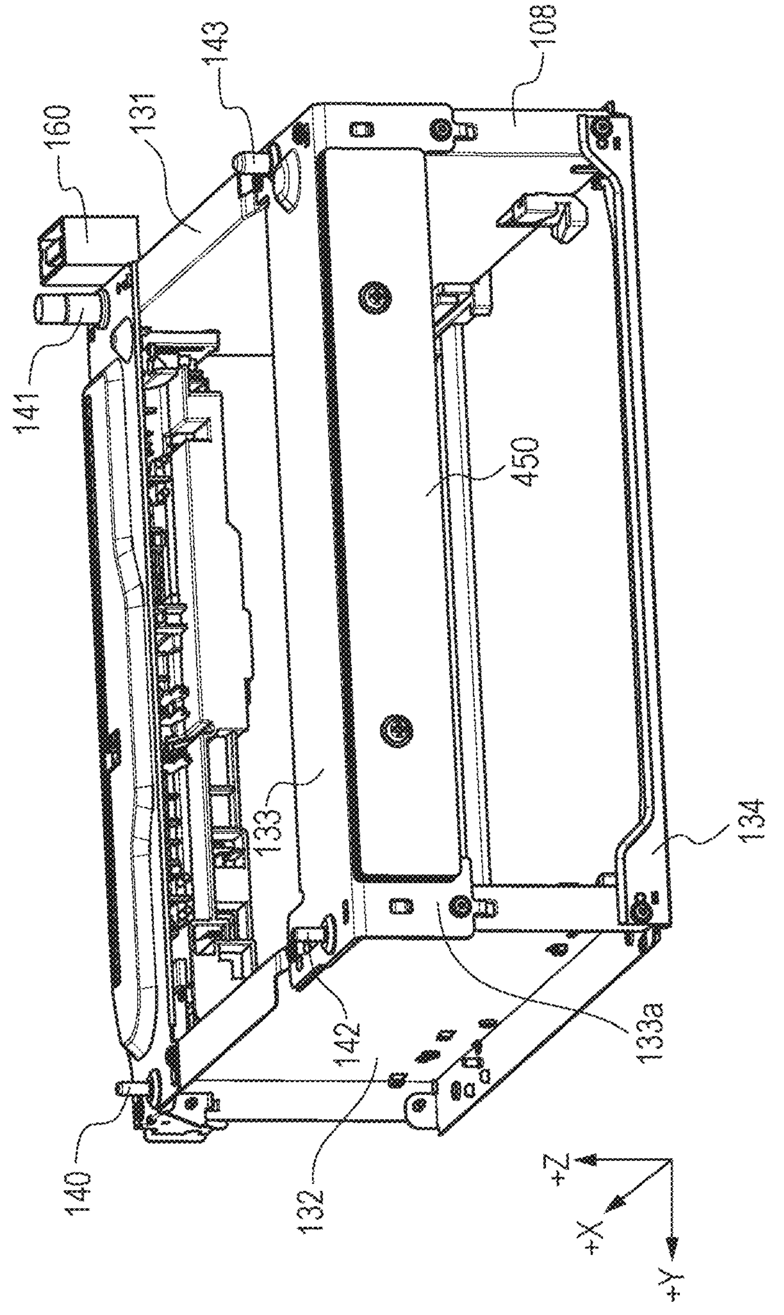
FIG. 11 is a perspective view illustrating a sheet feeding apparatus according to Example 4.

Example 4 will be described with reference to FIG. 11 which is a perspective view illustrating the sheet feeding apparatus 100. In Example 4, the position of the weight unit is different from that of Example 1. As illustrated in FIG. 11, the rear top plate 133 includes a first metal plate 133*a*. The first metal plate 133*a* stretches in the Z direction and in the Y direction and is fixed to the ends of the left plate 131 and the right plate 132, the ends facing in the −X direction. The weight unit 450 is fixed to the end of the first metal plate 133*a* facing in the −X direction (i.e., the surface of the first metal plate 133*a* facing in the −X direction). The weight unit 450 is disposed so as to stretch in the Y direction and in the Z direction. In Example 4, the weight unit 450 is positioned upstream of the weight unit 150 of Example 1 in the +X direction. Accordingly, the center of gravity of the sheet feeding apparatus 100 of Example 4 is positioned, in the first direction, upstream of the center of gravity of the sheet feeding apparatus 100 of Example 1. As a result, the stability of the sheet feeding apparatus 100 is further improved.

Example 5

Figure 12:
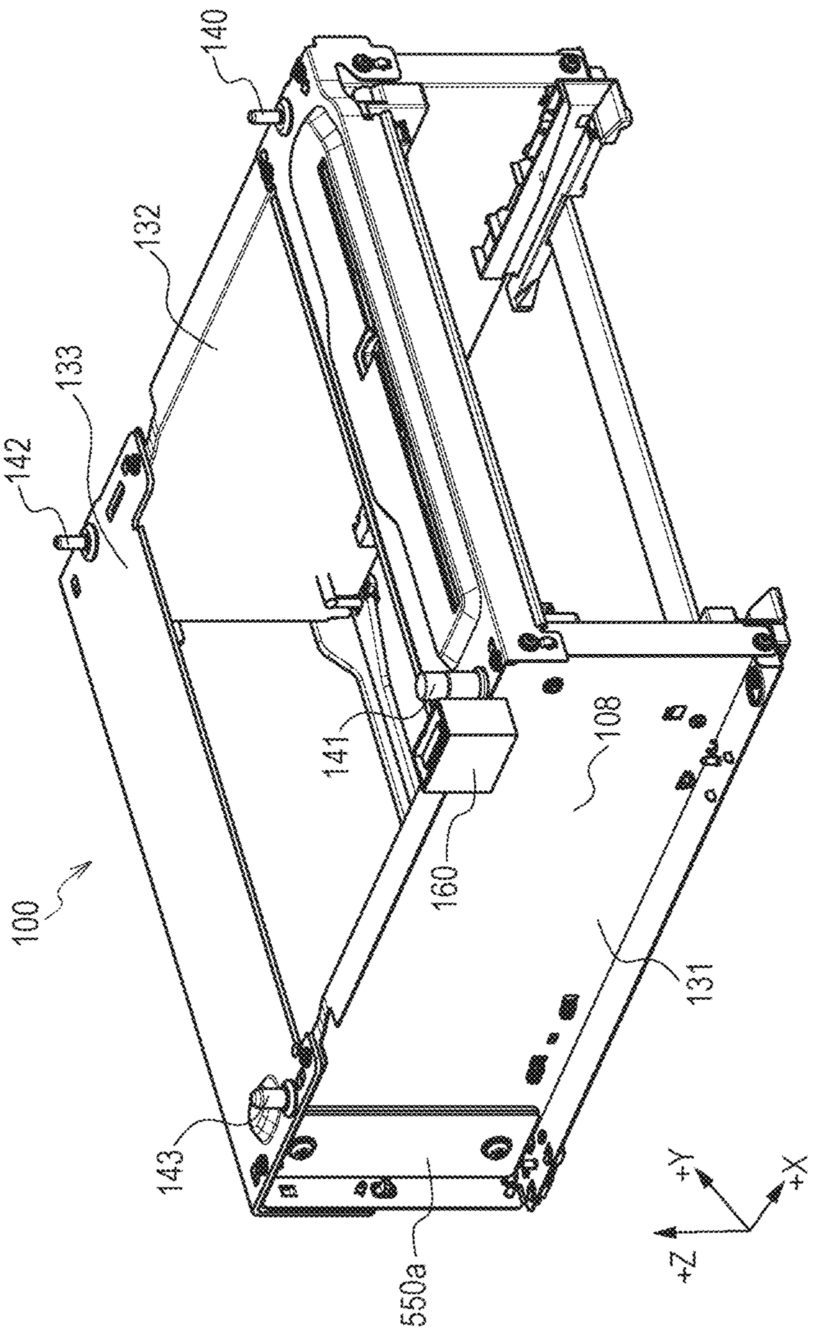
FIG. 12 is a perspective view illustrating a sheet feeding apparatus according to Example 5.
Figure 13:
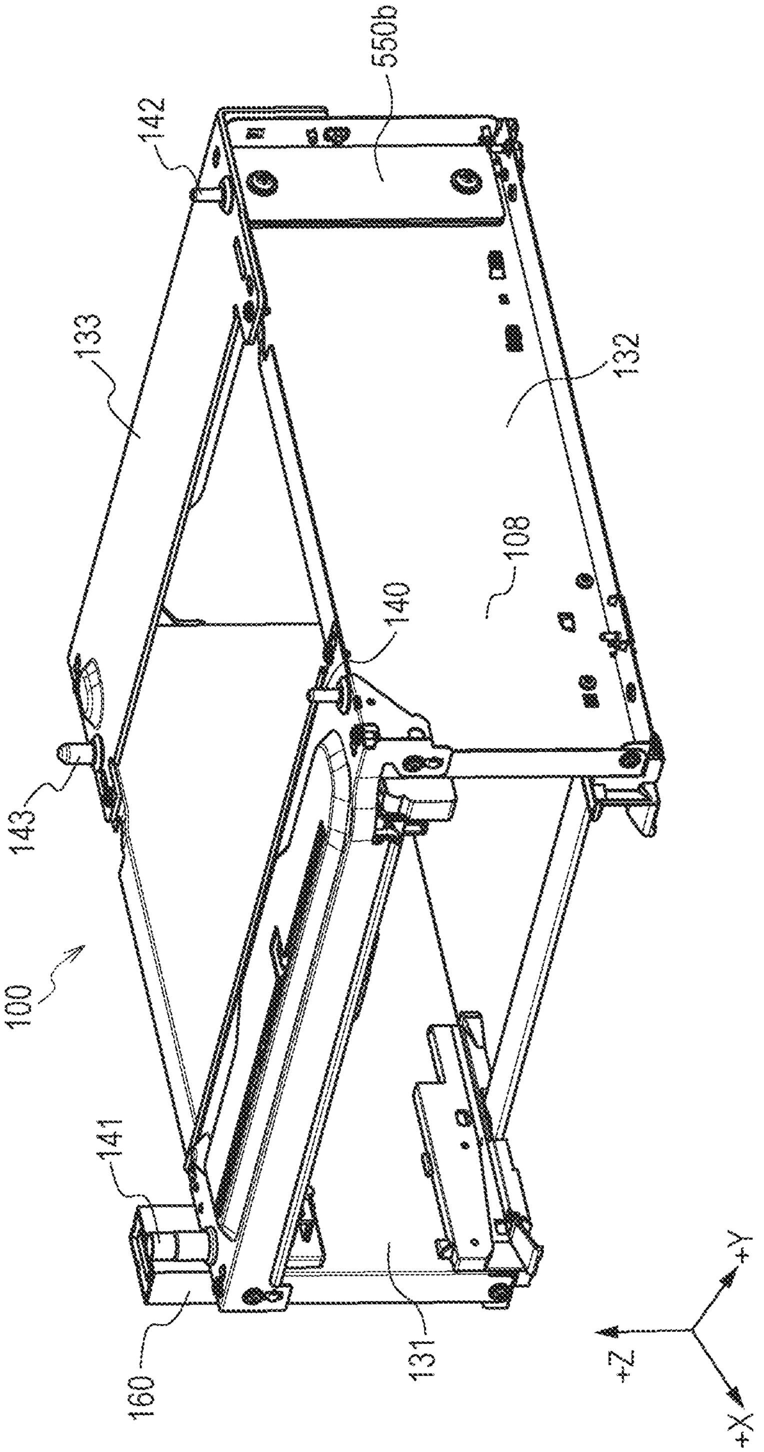
FIG. 13 is another perspective view illustrating the sheet feeding apparatus of Example 5.

Example 5 will be described with reference to FIGS. 12 and 13 that are perspective views illustrating the sheet feeding apparatus 100. In Example 5, the position of the weight unit is different from that of Example 1. As illustrated in FIGS. 12 and 13, a weight unit 550*a* is fixed to the left plate 131, and a weight unit 550*b* is fixed to the right plate 132. As in the case of Example 1, the weight unit 550*a*, 550*b* is positioned upstream of the center of gravity G in the +X direction.

Example 6

Figure 14:
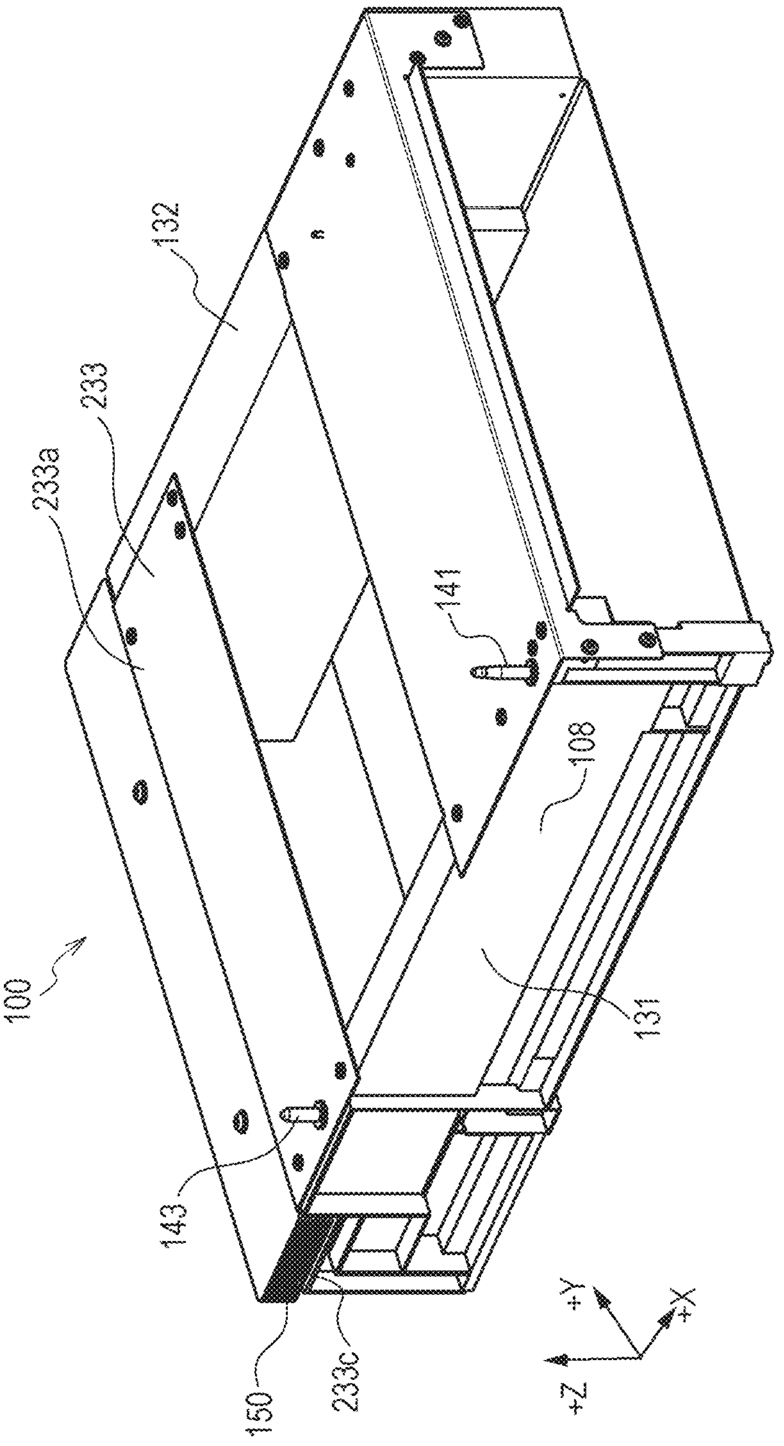
FIG. 14 is a perspective view illustrating a sheet feeding apparatus according to Example 6.
Figure 15:
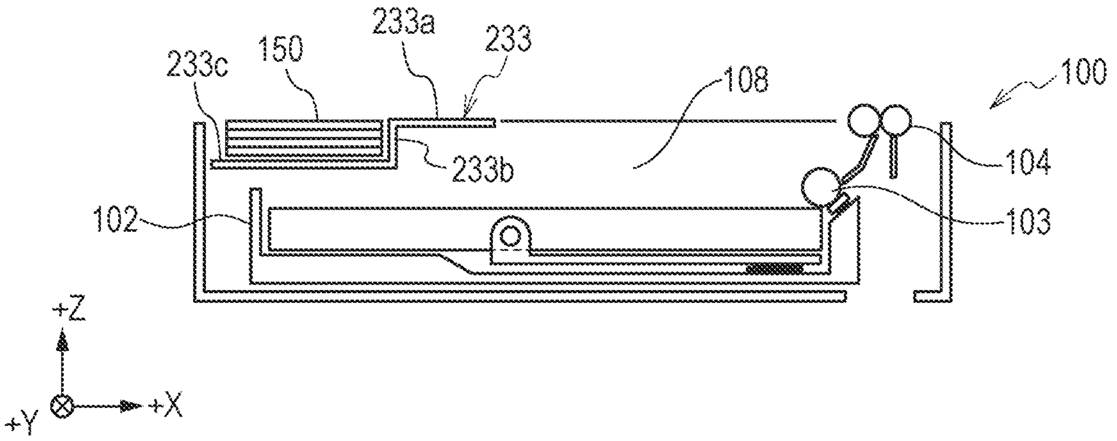
FIG. 15 is a schematic view illustrating the sheet feeding apparatus of Example 6.

Next, Example 6 will be described with reference to FIGS. 14 and 15. FIG. 14 is a perspective view illustrating the sheet feeding apparatus 100. FIG. 15 is a schematic view illustrating the sheet feeding apparatus 100. In Example 6, a rear top plate 233 and the weight unit 150 are configured differently from those of Example 1. As illustrated in FIG. 15, the rear top plate 233 is a metal plate having a first top-plate portion 233*a*, a second top-plate portion 233*b*, and a third top-plate portion 233*c*. The first top-plate portion 233*a* stretches in the X direction and in the Y direction, and the second top-plate portion 233*b* stretches in the Z direction and in the Y direction. The third top-plate portion 233*c* stretches in the X direction and in the Y direction. The edge of the first top-plate portion 233*a* facing in the −X direction is connected to the edge of the second top-plate portion 233*b* facing in the +Z direction. The edge of the second top-plate portion 233*b* facing in the −Z direction is connected to the edge of the third top-plate portion 233*c* facing in the +X direction.

In other words, the third top-plate portion 233*c* is positioned further in the −Z direction from the first top-plate portion 233*a*.

The weight unit 150 is connected to the end of the third top-plate portion 233*c* facing in the +Z direction (i.e., the surface facing in the +Z direction). Disposing the weight unit 150 in this manner improves the workability in replacing the weight unit 150 compared with the case of Example 1. In addition, the end of the weight unit 150 facing in the +Z direction is positioned upstream in the +Z direction from the end of the first top-plate portion 233*a* facing in the +Z direction.

With this configuration, an increase in the size of the sheet feeding apparatus 100 in the Z direction can be prevented when the weight unit 150 is mounted on the end of the rear top plate 233 facing in the +Z direction.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-121556, filed Jul. 26, 2023, which is hereby incorporated by reference herein in its entirety.

What is claimed is:

1. A sheet feeding apparatus configured to be connected to an image forming apparatus and to feed a recording medium to the image forming apparatus, the sheet feeding apparatus comprising:
- a housing part that includes
  - a first frame,
  - a second frame,
  - a feed unit that is positioned between the first frame and the second frame in a rotational axis direction of the feed unit and is configured to feed the recording medium,
  - a first member fixed to the first frame and to the second frame, and
  - a weight unit fixed to the first member; and
- a supporting member that is configured to support the recording medium and is movable in a first direction from a first position to a second position, the first position being a position at which the feed unit is able to feed the recording medium, the second position being a position at which the recording medium is able to be stacked in the supporting member,
- wherein the housing part is a part of the sheet feeding apparatus excluding the supporting member,
- wherein the first member and the weight unit are positioned upstream in the first direction from a center of gravity of the housing part, and
- wherein the weight unit is heavier than the first member.

2. The sheet feeding apparatus according to claim 1,
wherein the weight unit and the first member are positioned above a level of the supporting member in a vertical direction.

3. The sheet feeding apparatus according to claim 2,
wherein in the vertical direction, a lower end of the weight unit is positioned above a level of a lower end of the feed unit.

4. The sheet feeding apparatus according to claim 3,
wherein the weight unit is fixed to a lower end of the first member in the vertical direction.

5. The sheet feeding apparatus according to claim 4,
wherein the weight unit includes at least one metal plate.

6. The sheet feeding apparatus according to claim 5,
wherein the at least one metal plate comprises at least two metal plates.

7. The sheet feeding apparatus according to claim 6,
wherein in the first direction, the weight unit is closer to an upstream end of the housing part than the supporting member is to the upstream end of the housing part.

8. The sheet feeding apparatus according to claim 7, further comprising:
- a fixation member configured to fix the weight unit to the first member,
- wherein the at least two metal plates have respective holes,
- wherein the fixation member is disposed through the holes of the at least two metal plates and is fixed to the first member.

9. The sheet feeding apparatus according to claim 8,
wherein the first member has a connection portion configured to connect the sheet feeding apparatus to the image forming apparatus.

10. The sheet feeding apparatus according to claim 9, further comprising:
a third frame positioned upstream of the center of gravity in the first direction and fixed to the first frame and to the second frame.

11. The sheet feeding apparatus according to claim 10,
wherein in the first direction, the feed unit is closer to a downstream end of the housing part than the feed unit is to an upstream end of the housing part.

12. The sheet feeding apparatus according to claim 11,
wherein in the vertical direction, a thickness of the metal plate is smaller than a thickness of the first member.

13. The sheet feeding apparatus according to claim 1,
wherein the weight unit and the first member are positioned above a level of the supporting member in the vertical direction.

14. The sheet feeding apparatus according to claim 1,
wherein in a vertical direction, a lower end of the weight unit is positioned above a level of a lower end of the feed unit.

15. The sheet feeding apparatus according to claim 1,
wherein the weight unit is fixed to a lower end of the first member in a vertical direction.

16. The sheet feeding apparatus according to claim 1,
wherein the weight unit includes at least one metal plate.

17. The sheet feeding apparatus according to claim 16,
wherein the at least one metal plate comprises at least two metal plates.

18. The sheet feeding apparatus according to claim 17, wherein in a vertical direction, a thickness of the metal plate is smaller than a thickness of the first member.

19. The sheet feeding apparatus according to claim 1, wherein in the first direction, the weight unit is closer to an upstream end of the housing part than the supporting member is to the upstream end of the housing part.

20. The sheet feeding apparatus according to claim 17, further comprising:

a fixation member configured to fix the weight unit to the first member, wherein the at least two metal plates have respective holes, and wherein the fixation member is disposed through the holes of the at least two metal plates and is fixed to the first member.

21. The sheet feeding apparatus according to claim 1, wherein the first member has a connection portion configured to connect the sheet feeding apparatus to the image forming apparatus.

22. The sheet feeding apparatus according to claim 1, further comprising:

a third frame positioned upstream of the center of gravity in the first direction and fixed to the first frame and to the second frame.

23. The sheet feeding apparatus according to claim 1, wherein in the first direction, the feed unit is closer to a downstream end of the housing part than the feed unit is to an upstream end of the housing part.

24. A sheet feeding apparatus configured to be connected to an image forming apparatus and to feed a recording medium to the image forming apparatus, the sheet feeding apparatus comprising:

a housing part that includes a first frame, a second frame, a feed unit that is positioned between the first frame and the second frame in a rotational axis direction of the feed unit and is configured to feed the recording medium, a first member fixed to the first frame and to the second frame, and a weight unit fixed to the first member; and a supporting member that has a supporting surface configured to support the recording medium and is movable in a first direction from a first position to a second position, the first position being a position at which the feed unit is able to feed the recording medium, the second position being a position at which the recording medium is able to be stacked in the supporting member, wherein the housing part includes a housing upstream end that is an upstream end of the housing part in the first direction, wherein the housing part includes a housing downstream end that is a downstream end of the housing part in the first direction, wherein when the supporting member is at the first position, the supporting surface of the supporting member is positioned, in the first direction, between the housing upstream end and the housing downstream end, wherein the housing part is a part of the sheet feeding apparatus excluding the supporting member, wherein the housing part includes an upstream portion that is a portion positioned upstream in the first direction from a center of gravity of the housing part, wherein a first standard-sized sheet is a largest standard-sized sheet that can be stacked on the supporting surface, wherein a first maximum number of sheets is a maximum number of the first standard-sized sheets that can be stacked in the supporting member, and wherein weight of the upstream portion is greater than weight of the maximum number of the first standard-sized sheets.

25. A sheet feeding apparatus configured to be connected to an image forming apparatus and to feed a recording medium to the image forming apparatus, the sheet feeding apparatus comprising:

a housing part that includes a first frame, a second frame, a feed unit that is positioned between the first frame and the second frame in a rotational axis direction of the feed unit and is configured to feed the recording medium, a first member fixed to the first frame and to the second frame, and a weight unit fixed to the first member; and a supporting member that has a supporting surface configured to support the recording medium and is movable in a first direction from a first position to a second position, the first position being a position at which the feed unit is able to feed the recording medium, the second position being a position at which the recording medium is able to be stacked in the supporting member, wherein the supporting member is configured to assume a first state in which the supporting member has a predetermined length in the first direction and also to assume a second state in which the supporting member is stretched from that in the first state in a direction opposite to the first direction, wherein the housing part is a part of the sheet feeding apparatus excluding the supporting member, wherein the housing part includes an upstream portion that is a portion positioned upstream in the first direction from a center of gravity of the housing part, wherein a first standard-sized sheet is a largest standard-sized sheet that can be stacked on the supporting surface of the supporting member that is in the first state, wherein a first maximum number of sheets is a maximum number of the first standard-sized sheets that can be stacked in the supporting member, and wherein weight of the upstream portion is greater than weight of the maximum number of the first standard-sized sheets.

* * * * *